June 12, 1951

F. BUDDE

APPARATUS FOR PHOTOGRAPHICALLY RECORDING DOCUMENTS OR THE LIKE 2,557,026

Filed May 10, 1945

9 Sheets-Sheet 1

INVENTOR.
FREDERICK BUDDE
BY
Hoguet, Neary & Campbell
ATTORNEYS

June 12, 1951

F. BUDDE
APPARATUS FOR PHOTOGRAPHICALLY RECORDING DOCUMENTS OR THE LIKE 2,557,026

Filed May 10, 1945

9 Sheets-Sheet 2

INVENTOR.
FREDERICK BUDDE
By Hoguet, Neary + Campbell
ATTORNEYS

June 12, 1951 F. BUDDE 2,557,026

APPARATUS FOR PHOTOGRAPHICALLY RECORDING DOCUMENTS OR THE LIKE

Filed May 10, 1945 9 Sheets-Sheet 3

INVENTOR.
FREDERICK BUDDE
BY Hoguet, Neary & Campbell
ATTORNEYS

June 12, 1951

F. BUDDE 2,557,026

APPARATUS FOR PHOTOGRAPHICALLY RECORDING DOCUMENTS OR THE LIKE

Filed May 10, 1945

9 Sheets-Sheet 4

INVENTOR.
FREDERICK BUDDE
BY
Hoguet, Neary + Campbell
ATTORNEYS

June 12, 1951

F. BUDDE 2,557,026

APPARATUS FOR PHOTOGRAPHICALLY RECORDING DOCUMENTS OR THE LIKE

Filed May 10, 1945

9 Sheets-Sheet 5

INVENTOR.
FREDERICK BUDDE
BY
Hoguet, Neary & Campbell
ATTORNEYS

June 12, 1951

F. BUDDE 2,557,026

APPARATUS FOR PHOTOGRAPHICALLY RECORDING DOCUMENTS OR THE LIKE

Filed May 10, 1945

9 Sheets-Sheet 6

INVENTOR.
FREDERICK BUDDE
BY
Hoguet, Neary & Campbell
ATTORNEYS

INVENTOR.
FREDERICK BUDDE
BY
Hoguet, Neary & Campbell
ATTORNEYS

INVENTOR.
FREDERICK BUDDE
BY
Hoguet, Neary & Campbell
ATTORNEYS

June 12, 1951 F. BUDDE 2,557,026

APPARATUS FOR PHOTOGRAPHICALLY RECORDING DOCUMENTS OR THE LIKE

Filed May 10, 1945 9 Sheets-Sheet 9

INVENTOR.
FREDERICK BUDDE
BY
Hoguet, Neary & Campbell
ATTORNEYS

Patented June 12, 1951

2,557,026

UNITED STATES PATENT OFFICE 2,557,026

APPARATUS FOR PHOTOGRAPHICALLY RECORDING DOCUMENTS OR THE LIKE

Frederick Budde, Brooklyn, N. Y., assignor, by mesne assignments, to Bell & Howell Company, Chicago, Ill., a corporation of Illinois Application May 10, 1945, Serial No. 593,029

3 Claims. (Cl. 88—24)

This invention relates to photographic apparatus, more particularly for recording by photography discrete documents, drawings, and such matter.

Objects of this invention are improved photographic apparatus for recording by photography both the front and reverse sides of documents of the character of checks, recording one side of documents of the character of ledger sheets, eliminating all extraneous images, such as those caused by document holding or guiding devices, utilizing frictional driving means so as to eliminate sprocket holes with their attendant film wastage, providing two distinct reduction ratios so as to provide for maximum film economy in both double and single face photography, automatically spacing the film between images to improve film economy, improving the adaptability of the machine as a whole for use in conjunction with currently manufactured endorsing machines and the like, providing two complete independent daylight loading type cameras so as to facilitate extraction of less than a complete roll of exposed film, providing maximum accessibility of the cameras to facilitate loading of film with minimum distance between supply and winding rolls to reduce film losses, equipping the apparatus with automatic visual indicating means to indicate the amount of film on the supply spool and audio means to indicate breakage of film or failure of film drive or a predetermined safe minimum supply of film on the supply spool providing means to advance the film independently of its document control, providing complete accessibility of all the parts of the device requiring service, providing a physical form and feeding characteristics conducive to efficient and high speed operation, providing an external appearance to conform with conventional office furniture, eliminating the problem presented by lack of stiffness in thin and soft paper stock by feeding the document vertically downwardly through the viewing region or photographic field providing guide means for guiding documents of different sizes to the feeding roller and directly normal to the axis of the feeding roller, providing means for continuously operating the document feeding roller and for operating the camera under control of the document and through mechanism driven directly by the motor, providing means for preventing the operation of the apparatus when the camera is not properly positioned, providing means for adjusting the brightness of the illumination to provide for uniform density of images on the film of various colors of inked stamps on various colors of papers, controlling the length of document within the photographic field, varying the length of exposure of the document from one edge to the other to provide for uniform density of an image on the film transversely of the film, providing a receiving basket to receive and stack documents of various widths and lengths, providing improved means for preventing bending of the part of the document in the photographic field, providing improved means for energizing the illuminating means to ensure illumination of the document as it enters and leaves the photographic field, etc.

Other objects of this invention will appear from the following description taken in connection with the drawings, in which.

Figure 1:
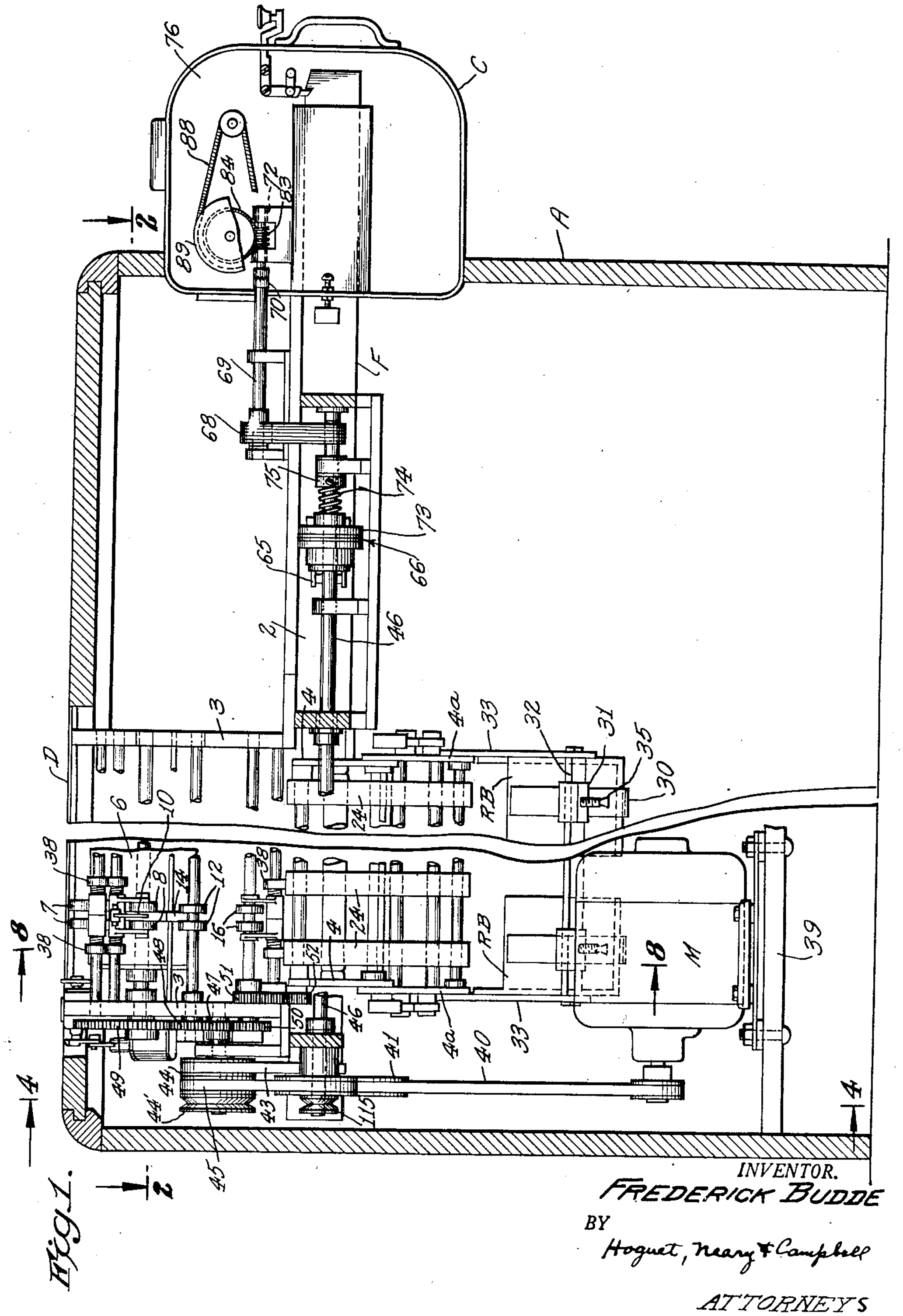
Figure 1 is a vertical longitudinal section taken through the apparatus to the rear of the feeding mechanism showing the feeding mechanism, camera clutch and the film driving means in the camera.

My invention will be described with reference to a preferred embodiment thereof illustrated in the drawings.

The apparatus shown is housed within a cabinet A, which as appears from the various figures, is of horizontally elongated rectangular form, and which is preferably suitably finished as office furniture, and the left-hand end wall of the cabinet, as viewed by the operator, is provided with an opening to receive a camera C. The horizontally disposed top wall of the cabinet is provided with an opening into which projects a top feed and guide plate D on which are mounted an on-and-off switch S, a cycle button CB, and an illumination or image density control button IC, and its cooperating sector IS, Figures 2, 6, 10 and 15.

The mechanism housed within the cabinet A, is supported on a frame member F, Figure 1, which includes a central horizontal main frame member 2, which may be suitably supported on the walls of the cabinet. Mounted thereon are vertical upstanding frame members 3 on which are journalled various shafts and from which depend frame members 4 on which are journalled other shafts, and from which are suspended carrier and stacker mechanisms, later referred to. It is optional whether the frame is supported on the cabinet or whether the frame rests on the floor and supports the cabinet.

Figure 8:
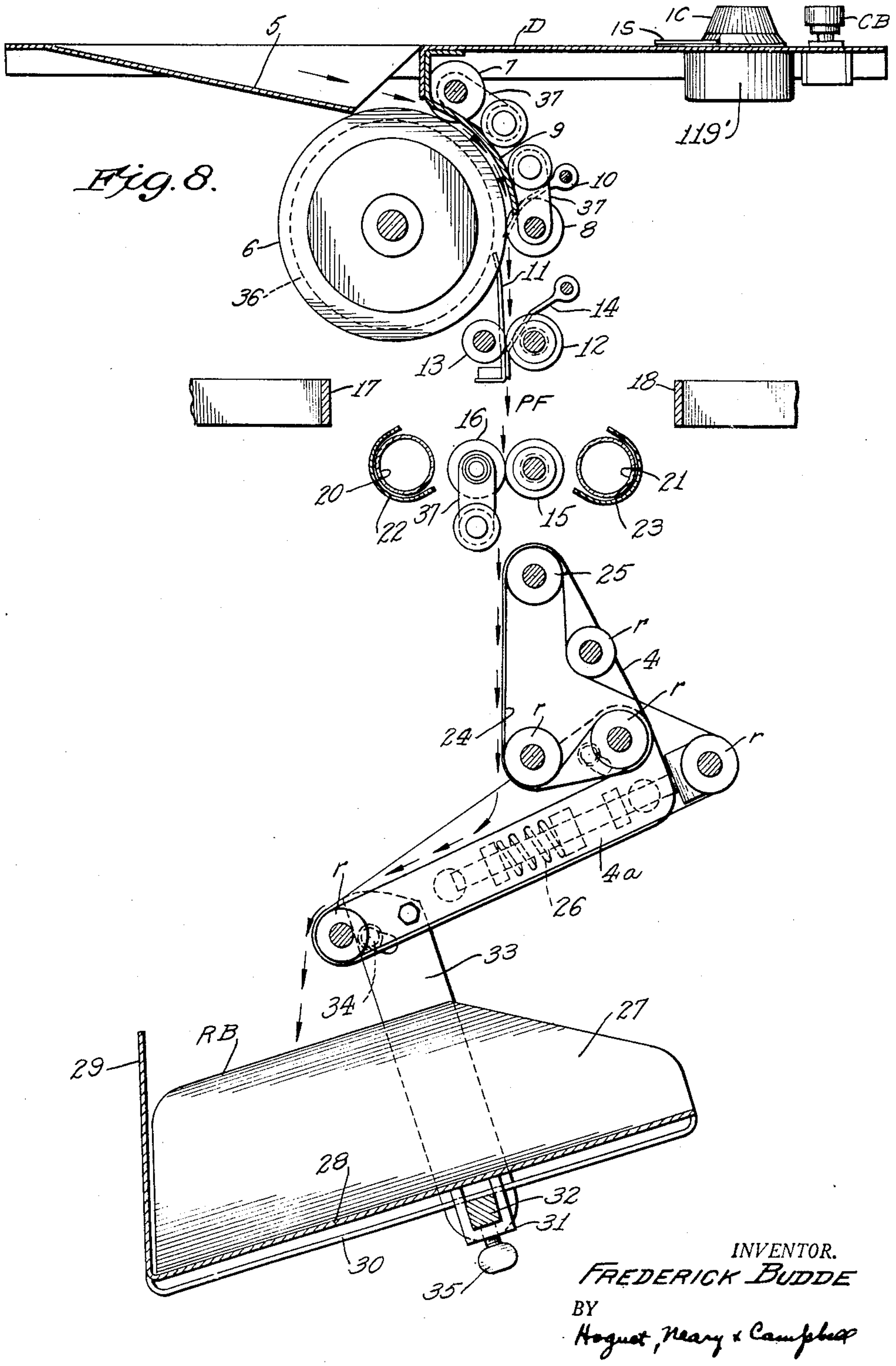
Figure 8 is a side view of the document feeding, conveying and stacking means.

As disclosed in Figure 8, the top guide plate D is provided with a document guide and feed table 5, which is downwardly inclined and predominately horizontal and over which sheets may correspondingly sequentially be fed edgewise into the cabinet and between a main driven feeding roller 6 and idler rollers 7 and 8, which project through a guide plate 9. As the document passes under the idler roller 8, it engages and operates a switch controlling arm 10. It is then fed along a guide plate 11 between an in-feed driven roller 12 and an idler roller 13 and engages and operates a switch arm 14 and thence is fed across the photographic field PF between an out-feed driven roller 15 and an idler roller 16. As the document passes through this field, it passes between reflectors 17 and 18, and the document may be illuminated on the obverse and front sides by long light bulbs 20 and 21 provided with reflectors 22 and 23 for directing the light toward both faces of the document.

The sheet feeding means, within the cabinet and comprising the rollers 6, 7 and 8, the guides 9 and 11, and the rollers 12, 13, 15 and 16, and the sheet feed guide 5 are disposed in the region of the right hand end of the cabinet as viewed by the operator, i. e., the end of the cabinet opposite that at which the camera C is disposed, and the downwardly inclined predominately horizontal sheet feed guide is directed transversely of the longitudinal extent of the cabinet and has its discharge end disposed intermediate the long sides of the cabinet, and sheets may be sequentially fed edgewise thereover in a downwardly inclined predominately horizontal direction into and intermediate the long sides of the cabinet, this direction of feed being desirable and particularly convenient in hand feeding from a stack of sheets. The sheet feeding means is adapted to receive sheets from the sheet feed guide and sequentially feed them edgewise, and is disposed intermediate the long sides of the cabinet and is directed transversely of the longitudinal extent of the cabinet, and comprises an upper feed portion, formed by the rollers 6, 7 and 8 and the guide plate 9, which provides a curved sheet path and is adapted to receive sheets from the sheet guide 5 in a downwardly inclined predominately horizontal direction and feed them downwardly in a vertical plane intermediate and disposed in correspondence with the long cabinet sides, and a lower feeding portion, formed by the guide plate 11 and the rollers 12, 13, 15 and 16, which is adapted to receive sheets from the upper feeding portion and to feed them downwardly in this vertical plane past the photographic field PF, within the cabinet, the path of the sheets being indicated by the arrows in Figure 8.

The reflectors 17 and 18 are horizontally directed and are arranged in opposed converging relation and on opposite sides of the photographic field PF and are directed toward the end of the cabinet at which the camera C is carried, the camera being adapted to receive images reflected by the reflectors for the photographic recording of the sheets or documents fed through the apparatus.

By reason of the arrangement above described, the machine may, as shown, be arranged in compact and convenient form within and on a cabinet conforming in size and shape with a usual elongated rectangular office desk, the longitudinal extent of the cabinet providing sufficient length of optical path between the reflectors 17 and 18 and the camera C, and the feed guide and feeding means providing for feeding the sheets in a convenient predominately horizontal direction from one long side of the cabinet, which may be termed the front thereof, and for advantageously feeding the sheets vertically past the photographic field.

As the document passes through the rolls 15 and 16, it is fed onto a belt conveyor 24, which passes over a driving roller 25 and supporting rollers $r$ arranged to provide a substantially vertically extending conveyor section against which the document is fed, so as to continue the movement of the document in a straight line, and to provide another section inclined at a suitable angle to the horizontal onto which the document is fed, and from which it is delivered into a receiving basket RB. Certain of these rollers are mounted on shafts journalled on the frames 4, and other rollers are mounted on shafts journalled in frame members $4a$, which are adjustably connected on the frame members 4 by means of slot and pin connections by means of which the inclination of the inclined section of the conveyor may be adjusted, and suitable means may be provided for locking the frame members $4a$ in adjusted position.

Figures 4, 5:
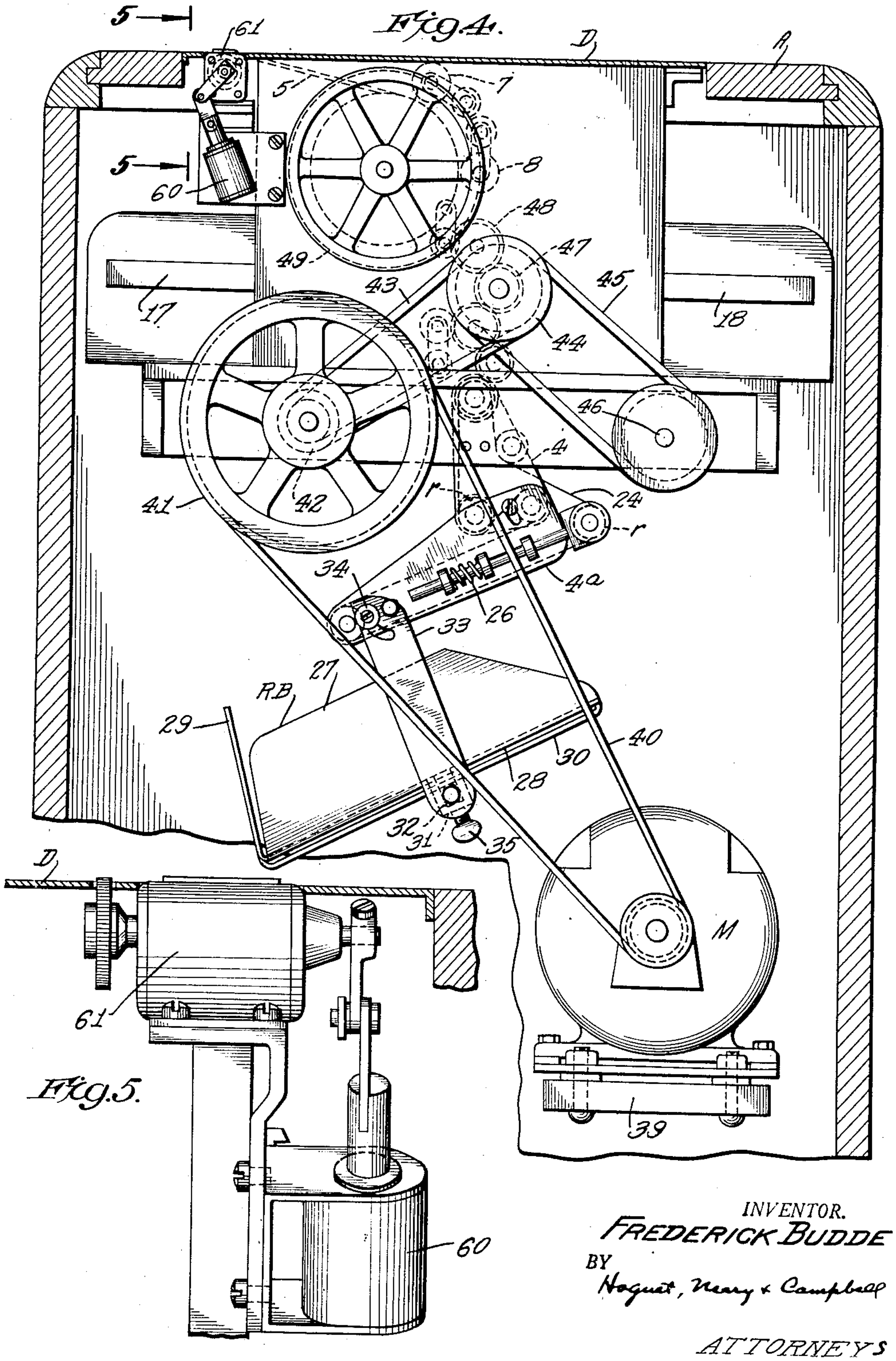
Figure 4 is a vertical front to rear section through the cabinet on line 4—4 of Figure 1.
Figure 5 is a sectional view on the line 5—5 of Figure 4 showing the counter mechanism in side view.

Suitable means such as shown at 26, Figure 4, may be provided to hold the carrier 24 under suitable tension.

The receiving basket RB preferably comprises a right and left half, each of which includes a side flange 27, a bottom flange 28, and a front flange 29, and spaced from the lower side of the bottom flange 28, a strap 30 which passes through slots in the legs of a U-shaped member 31, enclosing a supporting shaft 32, non-rotatably supported on members 33 pivoted on the frame members $4a$, and which may be adjusted and locked in adjusted position by means of a slot and cooperating locking screw as indicated at 34.

The U-shaped member 31 is provided with a thumb screw 35, which bears against the rod 32 and holds receiving basket halves in adjusted position.

By means of the adjustable features just described the halves of the basket may be moved toward each other or separated in accordance with the width of the document, and the halves may be slid forward with respect to the supporting rod 32 to accommodate the longer documents, and in the case of still longer documents the members 33 may be swung clockwise to position the front flanges 29 farther forwardly ahead of the delivery end of the conveyor.

Figures 2, 3:
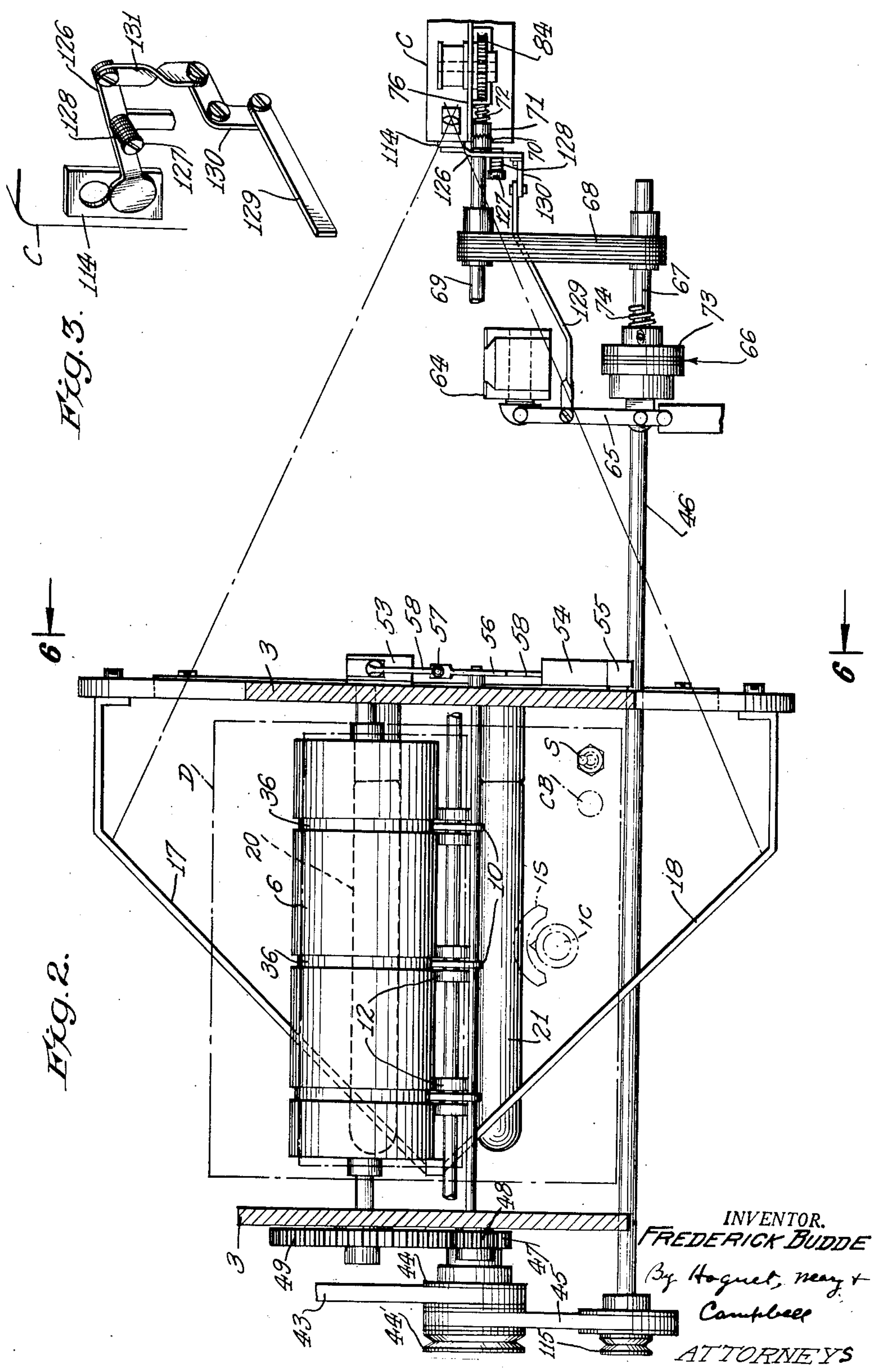
Figure 2 is a horizontal section taken generally on the line 2—2 of Figure 1.
Figure 3 is a detail view of a camera shutter and its operating mechanism.
Figures 9, 10:
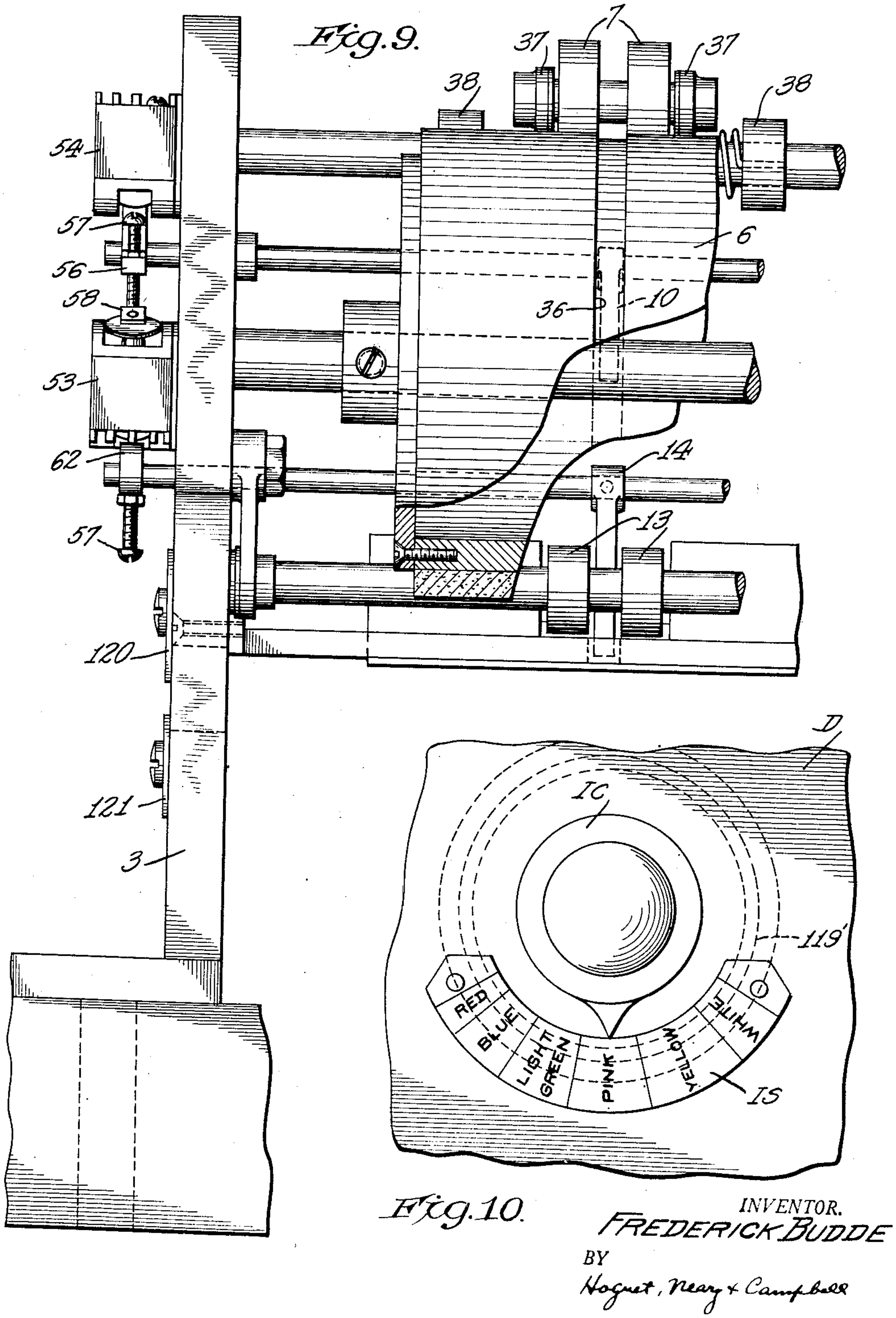
Figure 9 is an enlarged view of the upper left-hand mechanism shown in Figure 1.
Figure 10 is an illumination or image density control indexing means.

The main feeding roller 6 is of relatively large diameter and is preferably provided with three grooves 36, Figures 2, 8 and 9, into which project the ends of the switch arms 10, which may be three in number, but in any case one switch arm is provided and located at the right-hand end of the main feeding roller 6, so that the document regardless of its width will engage a switch arm 10, when it is held in contact as it is fed into the machine, with the right-hand side of the slot indicated at the left of Figure 2.

The driven rollers 12 are preferably arranged in pairs so as to provide slots for the switch arms 14 in alignment with the grooves in the main cylinder 6.

The idler rollers 7, 8 and 16 are also arranged in pairs, each pair being mounted on arms 37 (see also Figure 1) which are provided with hubs rotatable on shafts supported in the frame members 3, and means may be provided to lock the shafts in adjusted rotated position. Coil springs surrounding these shafts are connected to the arms 37 supporting the rollers and to collars 38, which are adjustably mounted on the shafts.

The source of power for driving the mechanism may be a motor M (Figure 1) suitably supported on the bottom shelf 39 of the cabinet. The shaft of the motor is provided with a pulley which through a belt 40 drives a large pulley 41, see also Figure 4, to which is connected a small pulley 42 over which passes a belt 43 which passes over a pulley 44 to which is connected another pulley over which passes a belt 45 extending over a pulley connected to the camera shaft 46.

Connected to the pulley 44 is a main gear 47, which meshes with a gear 48 connected to the shaft on which the rollers 12 are mounted, and which in turn meshes with a gear 49 attached to the shaft on which the main feeding roller 6 is mounted. Also meshing with the gear 47 is a gear 50 mounted on the shaft on which the rollers 15 are mounted. On the inner side of the frame member 3 is a gear 51 mounted on said latter shaft which through an intermediate gear drives a gear 52 connected on the shaft on which the driving roller 25 of the conveyor is mounted.

Figure 6:
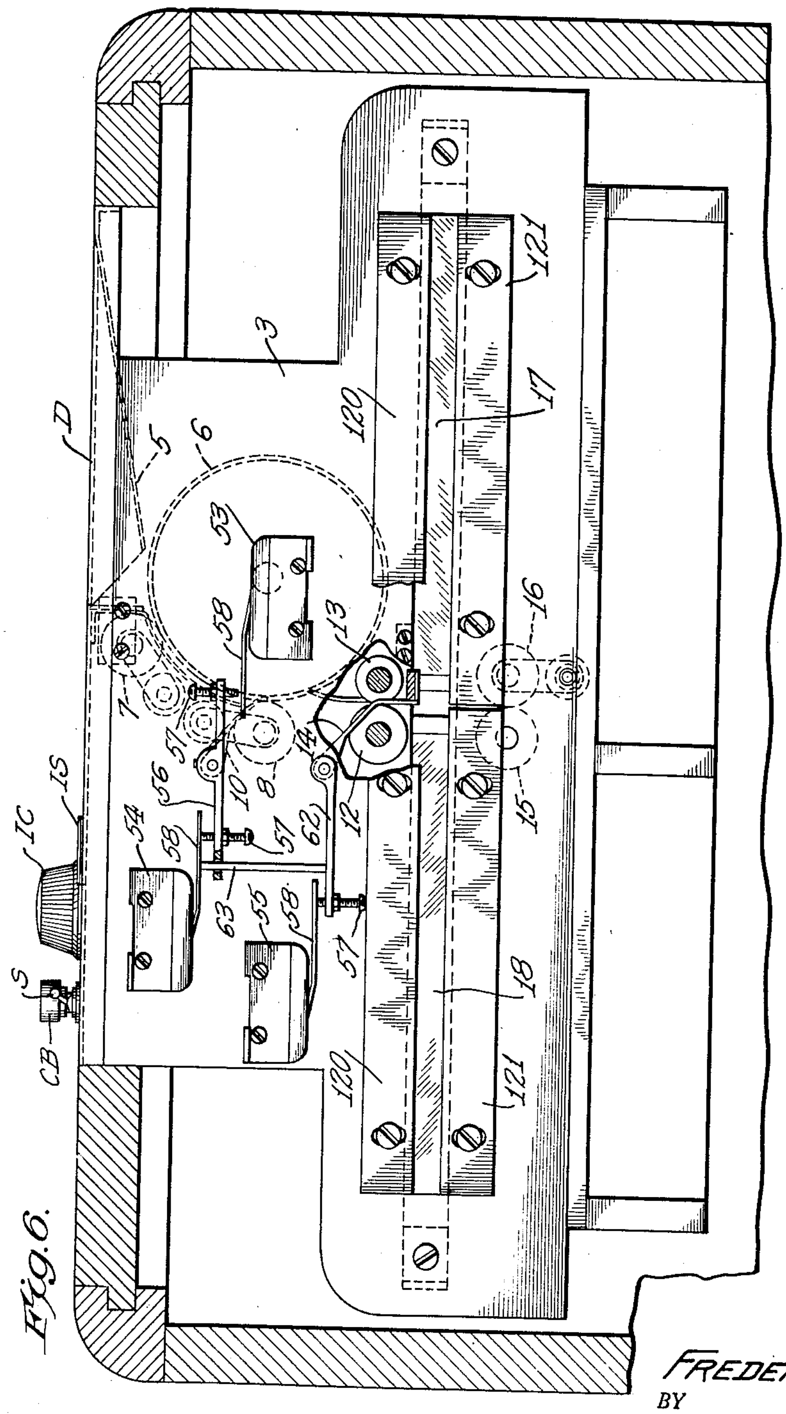
Figure 6 is a vertical front to rear section on the line 6—6 of Figure 2.
Figure 7:
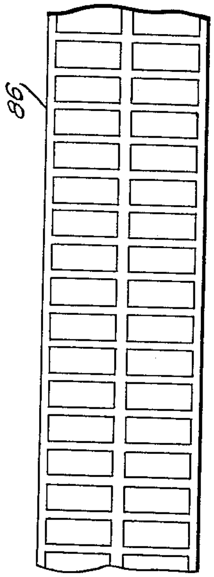
Figure 7 is a view of a short section of film on which front and obverse sides of the faces of checks have been recorded.

The switch arms 10 and 14, Figures 6 and 8, are mounted on shafts supported in the frame members 3. These arms control the microswitch 53 for controlling the operation of the consecutive counter, the microswitch 54 for controlling the operation of the light bulbs, and the microswitch 55 for controlling the operation of the camera clutch.

Mounted on the shaft to which the arm 10 is attached is a lever 56 provided at each end with an adjustable screw 57, which can be locked in adjusted position. One of the screws 57 bears against the arm 58 which operates the microswitch 53, and the other bears against the arm 58 which operates the microswitch 54. As a document rocks the arm 10, it closes the microswitches 53 and 54 to operate the consecutive counter and the illuminating means.

The consecutive counter 61, Figures 4 and 5, is operated by the plunger of the solenoid 60 through suitable mechanisms disclosed. The construction is such that the counter is stepped ahead upon energization of the solenoid by an actuating pawl which is moved into retracted position as the rearward edge of the card passes the arm 10. The usual means provided for resetting counters projects through a slot in the top plate D.

The switch operating arm 14 is provided with an angular extension, extending below the in-feed rollers 12 and 13, to the edge of the photographic field to give correct timing to the camera and illuminating means for photographing the rear portion of the document. This arm 14 is mounted on a shaft suitably journalled in the frame members 3, and on which is mounted an arm 62 which carries an adjustable set screw 57 which bears against the arm 58 of the microswitch 55, controlling the operation of the clutch. Mounted on the arm 62 is a rod 63 which passes through the end of the arm 56 and bears against the arm 58 associated with the microswitch 54. The function of this rod 63 is to keep the light circuit closed after the rear edge of the document has passed the arm 10 and to keep it closed as long as the camera clutch is engaged.

The microswitch 55, Figure 6, controls the circuit through a solenoid 64, Figure 2, which operates a clutch lever 65 suitably pivoted on the frame of the machine to engage the clutch 66 to connect the clutch shaft 46 to a shaft 67. This latter shaft is provided with a sprocket over which passes a chain belt 68 which passes over a sprocket mounted on a shaft 69 which projects into the camera opening in the cabinet and is provided with a clutch element 70 for engagement by a clutch element 71 on the main drive shaft 72, Figure 11, of the camera when the camera is properly positioned in the opening in the cabinet.

The element 73 of the clutch 66, which is slidably and non-rotatably supported on the shaft 67, is spring-pressed toward the other element of the clutch 66 by coil spring 74, the end of which as shown in Figure 1 bears against a collar 75 which is adjustable on the shaft for the purpose of adjusting the clutch.

Figure 11:
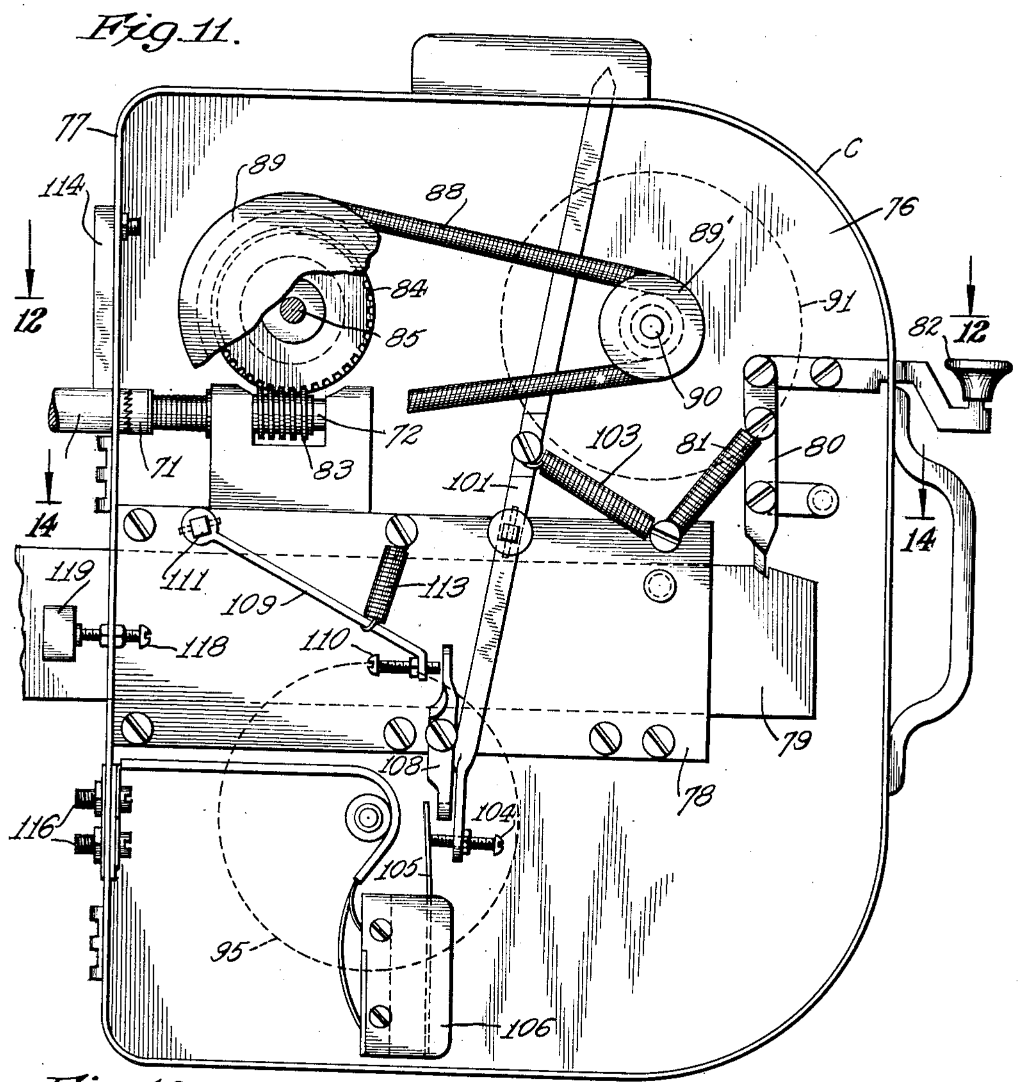
Figure 11 is a rear elevational view of the interior of the camera.
Figure 12:
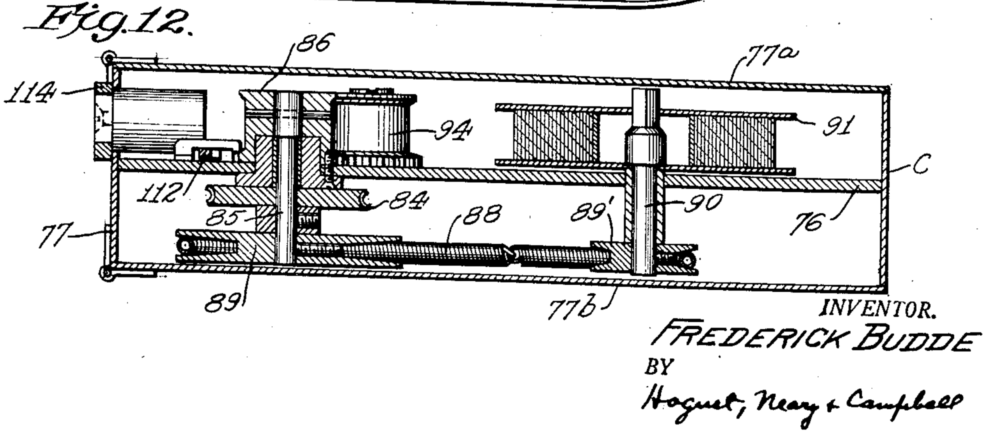
Figure 12 is a horizontal section of the line 12—12 of Figure 11.
Figures 13, 14:
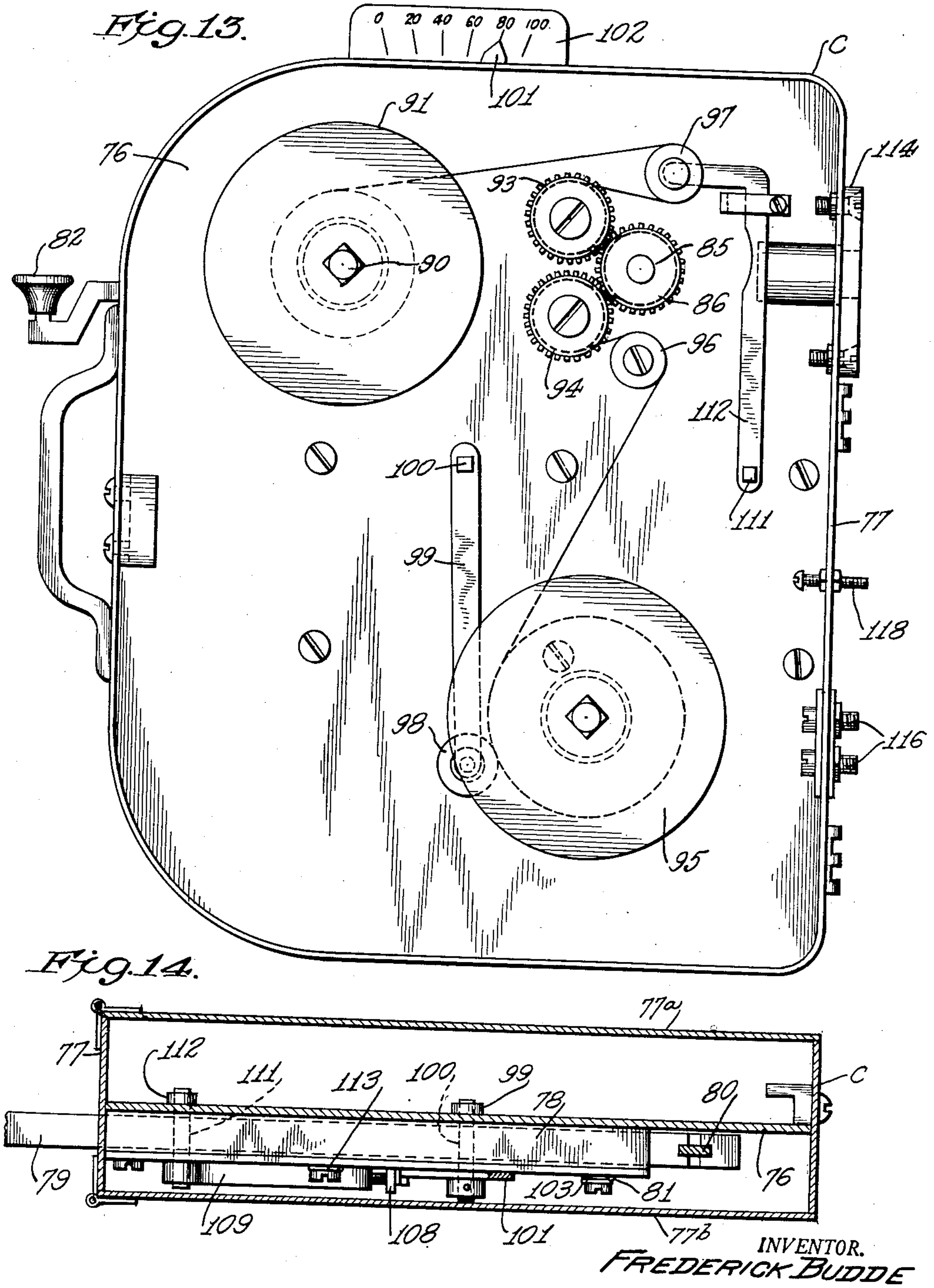
Figure 13 is a front elevational view of the interior of the camera.
Figure 14 is a horizontal view on the line 14—14 of Figure 11.

The camera C, Figures 11, 12, 13 and 14, comprises a casing which consists of a central partition 76 on which the various elements of the camera are mounted, and which includes a side wall 77 surrounding this partition providing front and rear compartments disclosed in Figures 13 and 11 respectively. The front compartment houses the film, and the rear compartment the driving mechanism, etc., and the compartments are provided with hinged doors as indicated at 77*a* and 77*b*, Figure 12.

Mounted on the central partition 76 of the camera is a plate 78, which, together with the partition 76, provides a slot receiving an extension 79 on the main frame for the purpose of supporting the camera. The end of the extension 79 is provided with a notch with which cooperates a locking pawl 80 suitably supported on the partition 76 and spring pressed into locking position by a spring 81. The locking pawl 80 can be withdrawn from the notch by means of a key 82 located exteriorly of the camera casing.

As the camera is placed in position, the clutch element 71 is engaged with the clutch element 70 to drivingly connect these shafts. The shaft 72, Figure 11, is provided with a worm 83, which operates a worm wheel 84 mounted on a shaft 85 which is journalled in and projects through the partition 76, and on the other end of which, Figure 13, is mounted a roller 86 on which the film is exposed. Secured on the shaft 85 adjacent the gear 84 is a pulley 89 over which passes a spring belt 88 which passes over a pulley 89′ connected to a shaft 90 which is journalled in and extends through the partition 76 and has mounted thereon the film take-up spool 91, Figure 13.

The film, Figure 13, is carried on a supply spool 95 suitably mounted on the partition 76 and passes over an idler roller 96 and thence over a driven roller 94, the roller 86, a driven roller 93, and a tension roller 97 onto the take-up spool 91. The rollers 94 and 93 are driven from the roller 86 through gears, as shown in Figures 12 and 13.

Cooperating with and pressing on the film of the supply spool 95, Figure 13, is a roller 98 carried by an arm 99 connected to a shaft 100 which extends through the partition 76 and on its other end, Figure 11, carries a lever 101 which extends through a slot in the camera casing as shown in Figures 11 and 13 into cooperative relation with an indicating scale 102, Figure 13, to indicate the supply of film on the supply spool 95. This lever 101 is drawn toward the right, Figure 11, by a spring 103 to hold the roller 98 in contact with the film on the supply spool 95.

Figure 15:
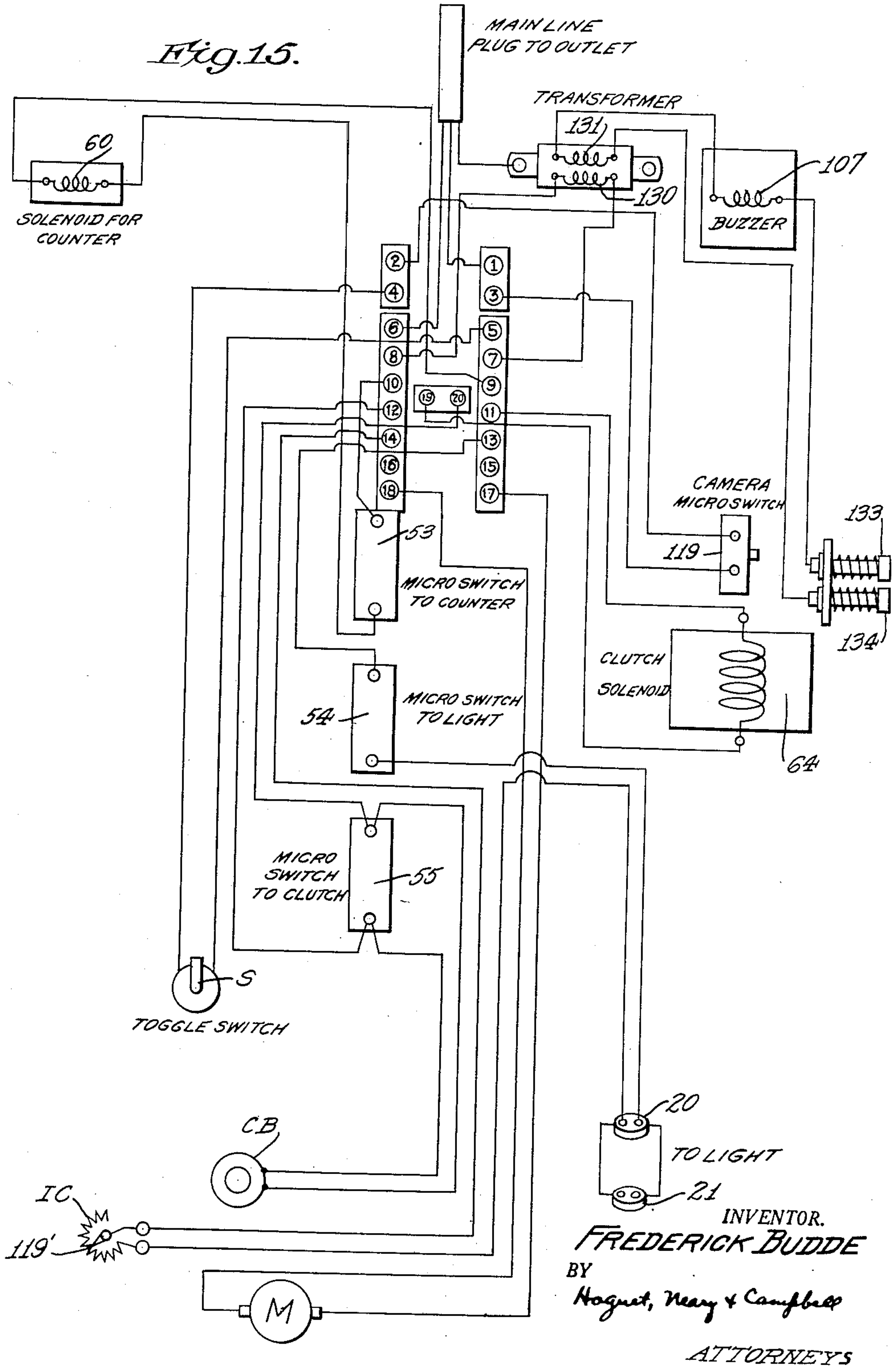
Figure 15 shows diagrammatic arrangement of the wiring and the electrical controls.

The lower end of the lever 101 is provided with an adjustable screw 104 which can be locked in position and which bears upon an arm 105 of a normally open microswitch 106 which controls a circuit to the buzzer 107, Figure 15. This operates to energize the buzzer when the supply of film on the supply spool has been reduced to a certain predetermined amount.

The lever 101, Figure 11, may also be operated by means of a lever 108 which in turn may be operated by an arm 109 through an adjustable set screw 110. The arm 109 is mounted on a shaft 111, which extends through the partition 76 and carries an arm 112, Figure 13, on which the tension roller 97 is supported. The arm 109 is normally pulled counter-clockwise by a spring 113, Figure 11, which moves the arm 112 and the roller 97 toward the right, Figure 13, in case of film breakage.

Mounted on the outer face of the inner wall of the camera casing, Figures 11 and 13, is a lens block 114 which is removably secured on the casing in order that lenses of different foci may be used for different photographic reductions. In the case where the camera is used for photographing the front and obverse sides of the document a lens of a reducing power of 30 to 1 is employed, and in the case of photographing one side of large documents a reduction of 18 to 1 is required.

For the purpose of operating the film at the right speed when a lens of 30 to 1 is employed, the camera shaft 46, Figure 1, is driven by the belt 45 and the pulleys over which it is trained for the purpose of driving the film at the proper speed. When a lens of the reduction of 18 to 1 is employed, the shaft 46 is driven by a belt from a pulley 44′ over a smaller pulley 115 mounted on the shaft 46.

As disclosed in Figure 11, the inner end wall of the camera casing is provided with a pair of contacts 116 connected to the terminals of the microswitch 106 and which are adapted, when the camera casing is in proper position in the machine, to engage contacts carried by the frame of the machine which are connected to the circuit wires leading to the buzzer 107, Figure 15. The camera casing also carries an adjustable screw 118 which when the camera casing is in proper position in the machine, closes the motor circuit through a microswitch 119 at one point, Figure 15, so that the circuit of the motor can be closed to operate the machine.

The illumination and density control button IC controls a rheostat 119′, Figure 15, in the lighting circuit to provide for uniform density of the image on the film. In order that this control may be predetermined, the scale or sector IS, Figure 10, is provided with colored segments as indicated, and arranged in the order shown to adjust the amount of illumination in accordance with the color of the matter photographed. For example, for a white document the pointer of the button IC would be adjusted over the white segment; for a yellow document over the yellow segment, etc.

The mirrors 17 and 18, Figures 2, 6 and 8, are located in a horizontal plane and arranged at an angle of 45° or thereabouts and are suitably supported on the main frame with their meeting ends located slightly to the right of the right-hand end of the document feed and guide slot, Figure 2. Disposed in front of each mirror and suitably supported on the left-hand frame member 3 of the machine, Figure 6, are transversely extending shields 120 and 121, which may be adjusted toward and away from each other to control the width and position of the slits formed by the shields and to provide slits of greater width toward the outer ends of the mirrors to increase the length of exposure of the left-hand portion of the document so as to obtain a uniform density of the image transversely of the film. The shields 120 and 121 may be brought into contact with each other on one side of the document, namely, the side corresponding to the back side of the document, to block off reflection of light from this side of the document when it is desired to photograph only the front face or side of the document. The corresponding lamp may also be removed, if desired.

The camera shutter is constituted by one end of a lever 126, Figures 2 and 3, suitably pivoted on the frame of the machine on a threaded pivot stud 127 and pressed toward the lens opening by a spring 128 interposed between the head of the stud and the lever 126. The lever is actuated from the clutch fork lever 65 through a link 129, a pivoted bell crank 130 and a link 131 as the clutch is engaged and disengaged.

*Circuits*

Figure 15 discloses a circuit diagram showing the circuits and various electrical devices diagrammatically.

After the camera has been loaded, it is placed and latched in position in the machine. This closes the microswitch 119 which electrically connects posts 2 and 3 of the panel board which is shown as comprising a series of strips carrying posts 1 and 3, posts 2 and 4, posts 5, 7, 9, 11, 13, 15 and 17, posts 6, 8, 10, 12, 14, 16 and 18, and posts 19 and 20. Posts 1 and 6 are to the lines from the main line plug.

The toggle switch S is now closed and connects the post 4, which is connected through the microswitch 119 to one of the main lines of the power circuit, to the post 5, thereby electrically connecting the panel strips which carry its posts 6, 8, 10, 12, 14, 16 and 18 and the posts 5, 7, 9, 11, 13, 15 and 17 to the main power lines. If the camera is not properly placed in position, then the machine circuit will be open in the microswitch 119 and will not be completed upon operation of the toggle switch S.

The machine is now cycled to advance the film by pressing the cycle button CB, Figure 15. The circuit controlled by the cycle button may be traced from the post 12 which is electrically connected to the supply post 6 through one of the posts of the microswitch 55, see also Figure 6, which controls the clutch through the button CB and then through the other post of the microswitch to the post 20, which is electrically connected to the post 19, and from thence across the clutch solenoid 64, see also Figure 2, and thence to the post 11, which is electrically connected to the post 5 in the main circuit controlled by the toggle switch S. The circuit of the motor is closed over posts 17 and 18. This causes the feeding cylinders to rotate and the camera mechanism to operate and advance the film.

The lamp circuit extends from post 13, Figure 15, across the microswitch 54, see also Figure 6, to the lamps or lights 20 and 21 in parallel, so that either light may be removed and the other energized. The other line of this circuit extends to the rheostat 119′ of the illumination and density control button IC and from thence to the post 14 which is electrically connected to the power supply post 6.

The circuit for the solenoid 60, Figure 15, of the consecutive counter may be traced from post 9 across the solenoid to the microswitch 53, see also Figure 6, and thence to post 10.

The circuit for the primary coil 130 of the transformer extends from the post 8 across the primary coil 130 of the transformer to the post 7.

The buzzer 107 is connected in one branch of the circuit of the secondary coil 131 of the transformer to a spring pressed contact member 133, and the other line of the secondary coil of the transformer is connected to another similar spring pressed contact member 134 which contact members are suitably supported on the frame of the machine and are adapted to be engaged by the fixed contact elements 116, Figure 11, on the inner wall of the camera to which the camera microswitch 106 is electrically connected. This microswitch is normally open and is adapted to be closed when there is a breakage of film or when the film is not loaded properly or when the amount of film supply on the supply spool has reached a predetermined minimum.

While I have described my invention with particularity with reference to a preferred embodiment illustrated, it is to be understood that this has been done for purposes of disclosure only and is not to be considered limiting and that I reserve the right to all such changes as fall within the principles of this invention and the scope of the appended claims.

I claim:

1. In a photographic apparatus, the combination of a camera, means for feeding a document through the photographic field of the camera, means for illuminating said document as it passes through said field, a motor for driving said feeding means, an electromagnetic camera clutch for driving the mechanism of the camera from said motor, a switch controlled by the forward edge of a document as it is fed toward said field for energizing said illuminating means, a second switch controlled by the forward edge of said document as it is moved closer to the photographic field to engage said clutch, and means for holding said first-mentioned switch closed until said second-mentioned switch is opened.

2. In a photographic apparatus, the combination of a camera, means for feeding a document through the photographic field of the camera, means for illuminating said document as it passes through said field, a motor for driving said feeding means, a camera clutch for driving the mechanism of the camera from said motor, a switch controlled by the forward edge of a document as it is fed toward said field for energizing said illuminating means, a second switch controlled by the forward edge of said document as it is moved closer to the photographic field to control the engagement of said clutch and a connection between said switches whereby the first-mentioned switch will be maintained in illuminating means energizing position while said second switch is in clutch engaged position.

3. In a photographic apparatus, the combination of a camera, means for feeding a document through the photographic field of the camera, means for illuminating said document as it passes through said field, a motor for driving said feeding means, a camera clutch for driving the mechanism of the camera from said motor, an arm operated by the forward edge of a document as it is fed toward said field, a switch closed by said arm for energizing said illuminating means, a second arm operated by the forward edge of said document as it is moved closer to the photographic field to engage said clutch, and a connection between said second-mentioned arm and said first-mentioned arm for holding said switch closed while said second arm is in clutch engaged position, said second-mentioned arm being provided with an extended document engaging surface and terminating at the edge of the photographic field whereby said clutch will be engaged prior to the entry of the forward edge of the document into the photographic field and whereby said clutch will be maintained engaged and said illuminating means energized until the rear edge of the document enters the photographic field.

FREDERICK BUDDE.

REFERENCES CITED

The following references are of record in the file of this patent:

UNITED STATES PATENTS

| Number | Name | Date |
|---|---|---|
| 1,752,648 | Matthews | Apr. 1, 1930 |
| 1,806,763 | McCarthy | May 26, 1931 |
| 1,919,433 | Hutchings | July 25, 1933 |
| 1,919,957 | Lyman et al. | July 25, 1933 |
| 1,957,889 | Hopkins et al. | May 8, 1934 |
| 1,966,348 | Hughey | July 10, 1934 |
| 2,001,598 | Caps | May 14, 1935 |
| 2,005,370 | Hughey | June 18, 1935 |
| 2,166,419 | O'Neill | July 18, 1939 |
| 2,177,135 | Fassel | Oct. 24, 1939 |
| 2,201,009 | Oiler | May 14, 1940 |
| 2,217,120 | Liebman | Oct. 8, 1940 |
| 2,251,570 | Hessert | Aug. 5, 1941 |
| 2,292,825 | Dilks | Aug. 11, 1942 |
| 2,364,188 | Bryce | Dec. 5, 1944 |
| 2,367,673 | Fassel | Jan. 23, 1945 |
| 2,403,711 | Egan | July 9, 1946 |